Figure 1:
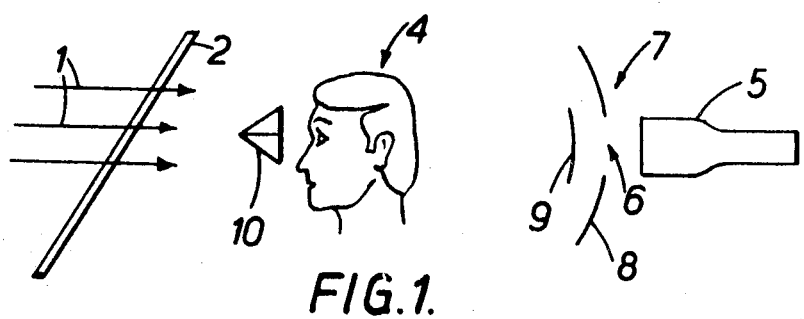

United States Patent

[11] 3,603,667

| | | | |
|---|---|---|---|
| [72] | Inventor | Michael H. Freeman Denbigh Court, England | |
| [21] | Appl. No. | 836,042 | |
| [22] | Filed | June 24, 1969 | |
| [45] | Patented | Sept. 7, 1971 | |
| [73] | Assignee | Pilkington Perkin-Elmer Limited Liverpool, England | |
| [32] | Priority | June, 1968 | |
| [33] | | Great Britain | |
| [31] | | 31226/68 | |

[54] HEAD-UP DISPLAYS
11 Claims, 2 Drawing Figs.

[52] U.S. Cl. ................................................. 350/103, 350/145
[51] Int. Cl. ..................................................... G02b 5/12
[50] Field of Search ........................................... 350/35, 36, 137, 138, 102, 103, 286, 287; 351/50

[56] References Cited
UNITED STATES PATENTS
2,428,859  10/1947  Turner ........................ 350/49 X
3,059,519  10/1962  Stanton ........................ 350/145
3,434,772   3/1969  Fogle ........................... 350/35
3,230,819   1/1966  Noxon .......................... 351/50

FOREIGN PATENTS
20,389  11/1900  Great Britain ................ 351/50
871,876   5/1942  France ........................ 350/102

Primary Examiner—David Schonberg
Assistant Examiner—Michael J. Tokar
Attorney—Mattern, Ware and Davis ABSTRACT: This invention relates to the provision of what is called a head-up display system for use in vehicles such as aircraft or land vehicles so that an observer can simultaneously view the outside scene and also visual information without having to look down to consult a dial or the like. The new system includes a source of light information signals, a collimated light beam carrying the information and travelling in a direction opposite to the direction of movement of light from an outside scene and at least one optical element to reflect light from the collimated beam to cause it to travel along a path parallel to its original path but in the opposite direction so as to superimpose an image of the light information signals on the field of view of the observer.

PATENTED SEP 7 1971 3,603,667

3,603,667

HEAD-UP DISPLAYS

BACKGROUND TO INVENTION

A head-up display system serves to superimpose visual information on the field of view of an observer in a vehicle, for example a pilot in an aircraft, so that the observer can simultaneously view the outside scene and see the visual information without having to change his direction of view, in particular without having to lower his head. Head-up display systems in general use in aircraft normally utilize a partially light-reflecting system to superimpose the information upon the pilot's view of the outside scene, i.e. his view through the windscreen, so that he can observe information from instruments and equipment within the aircraft without removing his eyes from the outside scene. To achieve maximum utilization of this information, there is usually provided an optical system effective to collimate light carrying the information so as effectively to form an image which appears at infinity, whereby the pilot can view the information without having to refocus his eyes.

If the optical system presenting the information to the pilot is mounted solely on the aircraft, it is relatively easy to relate the information transmitted to the orientation of the aircraft. However, in present day aircraft it is generally not acceptable for technical and operational requirements of other equipment in the pilot's cabin to position the head-up display optical system mounted on the aircraft closer to the pilot's eyes than about 18 to 20 inches. Since the pilot's available field of view of the information, i.e. the angle that the exit pupil of the system subtends at the pilot's eyes, is dependent on the distance between the optical system and the pilot, as well as on the physical dimensions of the components of the optical system, this minimum acceptable distance limits the pilot's field of view of information, and hence restricts the total amount of information which can be effectively displayed.

It has been proposed, with this distance restriction imposed by the surrounding environment in mind, to mount the complete head-up display optical system on the pilot's head, with partially reflecting elements being worn in the same fashion as spectacles, to give an increased available field of view of information. However, practical problems then arise in relating the pilot's head position to the orientation of the aircraft.

It is an object of the present invention to provide a head-up display system which is particularly, but not exclusively, suitable for use in modern aircraft, by which the extent of the above-mentioned problems can be at least reduced.

According to the present invention there is provided head-up display apparatus for displaying visual information to an observer in a vehicle, for example an aircraft, the observer having a field of view of the outside scene from which the observer receives light travelling generally in a predetermined direction relative to the vehicle, the apparatus comprising a source of light information signals, means to produce a collimated light beam carrying said light information signals and travelling in a direction opposite to said predetermined direction, and at least one optical element adapted to reflect light from said collimated beam to travel along a path parallel to its original path but in the opposite direction, thereby to superimpose an image of the light information signals on the field of view of the observer. The source of light information signals and the means to produce a collimated light beam can be mounted on the vehicle, and the optical element can be mounted on the observer.

The optical element may have a plurality of reflecting faces such as to effect multiple reflections of light from said collimated beam and to subject the light to a sideways shift during reversal of its direction of travel. Preferably the optical element comprises a cube corner reflector having three mutually perpendicular reflecting faces. One reflecting face may be partially reflecting, so that light from the outside scene can be transmitted therethrough to the observer, and another face, or the other faces, may be fully reflecting. If desired, one or more of the reflecting faces may have a wavelength-selective reflective coating, such as a dichroic or a trichroic coating.

Said means to produce a collimated light beam may be effective to produce collimated light travelling past both sides of the observes's head, and the apparatus may comprise a pair of optical elements arranged one substantially in front of each eye of the observer to reflect light towards the respective eye. Thus there may be provided a single source of light information signals located substantially directly behind the observer, and optical means adapted to collimate light emitted by said source, and to direct the collimated light past both sides of the observer's head: said optical means may for example comprise a convex mirror and a concave mirror. Alternatively there may be provided two sources of light information signals located behind the observer but to opposite sides of his head and means to collimate light emitted by each source so as to produce two collimated light beams travelling respectively on opposite sides of the observer's head.

The or each source of light information signals may comprise a cathode-ray tube.

Figure 2:
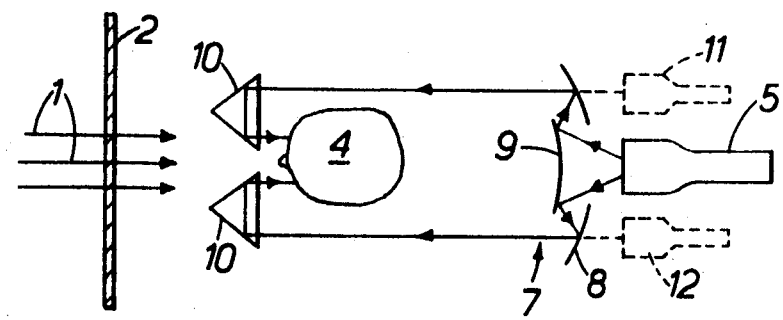

Apparatus in accordance with the invention will now be described, by way of example, with reference to the accompanying drawing, in which:

FIG. 1 is a schematic side elevation of head-up display apparatus fitted in an aircraft and showing the positional relationship of the apparatus to the head of a pilot; and FIG. 2 is a schematic plan view of the apparatus shown in FIG. 1 further indicating in broken line a modification to the apparatus.

FIGS. 1 and 2 show the windscreen 2 of an aircraft cabin or cockpit. Light indicated as 1 passing through the windscreen is received by the eyes 3 of the pilot whose head is indicated as 4. The pilot faces generally forwardly so that light received by him is travelling generally in a direction from left to right as viewed in FIG. 1.

Information to be superimposed on the pilot's field of view is converted into light information signals by a cathode-ray tube 5 located directly behind the pilot, the signals appearing as visual information on the cathode-ray tube screen. In front of the cathode-ray tube screen is a mirror arrangement generally indicated as 7 and comprising a concave spherical mirror 8 having a central aperture 6 through which light can pass from the cathode-ray tube screen to a convex spherical mirror 9. Light emitted by the cathode-ray tube initially passes through the aperture in the mirror 8, and is then reflected by the mirror 9 onto the reflecting surface of the mirror 8, from which it travels forwardly as a collimated beam, the collimated light passing on both sides of the pilot's head 4.

Located in front of the eyes 3 of the pilot are two corner cube reflectors 10 disposed one in front of each eye. These corner cube reflectors, or retroreflectors, each comprise three reflecting surfaces arranged mutually at right angles (i.e. have the shape of the corner portion of a cube), and have the property that light entering the reflector is reflected three times, once by each reflecting surface, and then emerges therefrom along a path parallel to and shifted sideways from its original path but in the opposite direction. Thus the collimated light directed forwardly by the mirror 8 is reflected by the reflectors 10 rearwardly towards the pilot's eyes. The light received by the pilot from the reflectors is thus travelling in the same direction as the light he receives from the outside scene, each reflector directing light towards the respective eye in front of which it is located. In this manner an image of the visual information appearing on the cathode ray tube screen is superimposed on the pilot's field of view, and, since the light carrying the information signal is collimated, the pilot sees an image of the information at infinity.

The cube corner reflectors may each consist of a solid piece of glass having three mutually perpendicular faces and a fourth face at 45° to each of the other three, or may each comprise three plane pieces of glass secured together mutually at right angles in cube corner arrangement.

The reflectors 10 are partially light-transmitting so that light from the outside scene can pass through the reflectors to the pilot's eyes. MOre particularly, one of the reflecting faces of each reflector is partially silvered so as to be partially reflecting, while the other two of the reflecting faces are fully silvered so as to be fully reflecting, and the reflector is so positioned that the partially reflecting face is located directly in front of the pilot's eye so that he views the outside scene therethrough. The two fully reflecting faces are then located to the side of the pilot's head so that they effectively collect light from the collimated beam passing that side of his head. If desired, however, the reflecting faces of the retroreflectors may have a suitable coating effective to impart wavelength-selective reflecting properties such that the face has high reflectivity in relation to light within a given wavelength band or bands and a relatively high transmission of light of other wavelengths. The information signals can then be transmitted to the pilot by light of a wavelength or wavelengths within said band or bands, which is therefore reflected by the coated faces, while light of other wavelengths from the outside scene is transmitted through the reflectors. For example, the reflecting faces may have a dichroic or trichroic coating.

The mirror system 7 and the cathode-ray tube 5 are mounted by suitable fixings on the body of the aircraft so that the angles and orientations of the emitted information signals presented to the pilot will be related to the aircraft position or orientation. The retroreflectors 10 are mounted on the pilot's head, e.g. are mounted on a frame and worn in the fashion of spectacles. Due to the optical properties of the cube corner reflectors, the image of the information signals seen by the pilot will retain its relationship to the aircraft position or orientation despite movement of the pilot's head and resultant changes in orientation or position of the reflectors.

It will be appreciated that, if preferred, the mirror system 7 described above can readily be replaced by a lens system effected to achieve substantially the same result, namely to produce a collimated beam carrying the light information signals and travelling past both sides of the pilot's head.

In an alternative embodiment in accordance with the invention the mirror system 7, or an equivalent lens system, may be omitted and there may be provided instead of the single cathode-ray tube 5 a pair of cathode-ray tubes indicated in broken line as 11 and 12 in FIG. 2. The two cathode-ray tubes 11 and 12 are located behind the pilot but to opposite sides of his head, and suitable collimating optics are provided to produce a collimated beam of light on each side of the pilot's head, the beam carrying light information signals appearing on the screen of the respective cathode-ray tube. If the signal on the two tubes is identical then the pilot will see a single image of the visual information signal at infinity.

What I claim is:

1. Head-up display apparatus for displaying visual information to an observer in a vehicle, for example an aircraft, the observer having a field of view of the outside scene from which the observer receives light travelling in a predetermined direction relative to the vehicle, the apparatus comprising a source of light information signals, means to produce a collimated light beam carrying said light information signals travelling in a direction opposite to said predetermined direction, said source of light information signals and said means to produce a collimated light beam being mounted on the vehicle whereby said opposite direction is fixed with respect to the vehicle and the observer may move relative to said fixed opposite direction of the light information signals, and at least one cube corner reflector mounted on the observer's head for movement with the observer's head relative to said fixed opposite direction of the light information signals, the cube corner reflector being partially transparent and having three mutually perpendicular reflecting faces disposed to receive said collimated light beam and by reflection of said collimated light beam from each of said three mutually perpendicular reflecting faces to subject said collimated light beam to a sideways shift and to return said collimated light beam along a path parallel to its original path and in the opposite direction thereto, thereby superimposing an image of the light information signals carried in said collimated light beam on the field of view of the observer.

2. Head-up display apparatus as defined in claim 1 wherein at least one of said mutually perpendicular reflecting faces is partially reflecting so that light from the outside scene can be transmitted therethrough to the observer, and at least one other of said mutually perpendicular reflecting faces is fully reflecting.

3. Head-up display apparatus as defined in claim 1 wherein the cube corner reflector comprises one partially reflecting face and two fully reflecting faces.

4. Head-up display apparatus as defined in claim 1 wherein said cube corner reflector has at least one reflecting face having a wavelength-selective reflective coating.

5. Head-up display apparatus as defined in claim 7 wherein said face has a dichroic coating.

6. Head-up display apparatus as defined in claim 7 wherein said face has a trichroic coating.

7. Head-up display apparatus as defined in claim 1 wherein said means to produce a collimated light beam is effective to produce collimated light travelling past both sides of the observer's head, and further comprising a pair of cube corner reflectors arranged one substantially in front of each eye of the observer to reflect light towards the respective eye.

8. Head-up display apparatus as defined in claim 10 comprising a single source of light information signals located substantially directly behind the observer, and optical means adapted to collimate light emitted by said source, and to direct the collimated light past both sides of the observer's head.

9. Head-up display apparatus as defined in claim 11 wherein said optical means comprise a convex mirror and a concave mirror.

10. Head-up display apparatus as defined in claim 10 comprising two sources of light information signals located behind the observer but to opposite sides of his head, and means to collimate light emitted by each source so as to produce two collimated light beams travelling respectively on opposite sides of the observer's head.

11. Head-up display apparatus as defined in claim 1 wherein the source of light information signals comprises a cathode-ray tube.

UNITED STATES PATENT OFFICE
CERTIFICATE OF CORRECTION

Patent No. 3,603,667        Dated September 7, 1971

Inventor(s) Michael H. Freeman

It is certified that error appears in the above-identified patent and that said Letters Patent are hereby corrected as shown below:

Column 3, Line 3, "MOre" should be --More--

Column 4, Line 30, "sald" should be --said--

Column 4, Line 37, "sald" should be --said--

Column 4, Line 32, "Claim 7" should be --Claim 4--

Column 4, Line 34, "Claim 7" should be --Claim 4--

Column 4, Line 42, "Claim 10" should be --Claim 7--

Column 4, Line 47, "Claim 11" should be --Claim 8--

Column 4, Line 50, "Claim 10" should be --Claim 7--

Signed and sealed this 9th day of May 1972.

(SEAL)
Attest:

EDWARD M. FLETCHER, JR.
Attesting Officer

ROBERT GOTTSCHALK
Commissioner of Patents